United States Patent [19]

Östemar

[11] Patent Number: 4,750,415
[45] Date of Patent: Jun. 14, 1988

[54] DEVICE FOR PRESSING AND MOLDING CURD

[76] Inventor: Per Östemar, Ringvagen 5, S-520 30 Ljung, Sweden

[21] Appl. No.: 37,356
[22] PCT Filed: Jun. 30, 1986
[86] PCT No.: PCT/SE86/00319
§ 371 Date: Mar. 4, 1987
§ 102(e) Date: Mar. 4, 1987
[87] PCT Pub. No.: WO87/00002
PCT Pub. Date: Jan. 15, 1987

[30] Foreign Application Priority Data

Jul. 9, 1985 [SE] Sweden ............................... 8503413

[51] Int. Cl.⁴ ...................... A01J 25/00; A01J 25/13; A01J 25/15
[52] U.S. Cl. ........................................ 99/458; 99/456; 99/465
[58] Field of Search .................... 99/452, 456–466; 426/582, 583, 519, 36, 40; 425/85, 84, 297, 302.1, 398

[56] References Cited

U.S. PATENT DOCUMENTS 2,846,767 8/1958 Hensgen et al.
3,465,439 9/1969 Wakeman.

FOREIGN PATENT DOCUMENTS 1134240 12/1960 Fed. Rep. of Germany.
3229241 8/1982 Fed. Rep. of Germany.
95245 1/1963 Netherlands.

Primary Examiner—Timothy F. Simone
Attorney, Agent, or Firm—Sughrue, Mion, Zinn, Macpeak and Seas

[57] ABSTRACT

A device for pressing and molding curd includes a mold reverser (1) in the form of an endless conveyor (16) transporting cheese molds (2) along a horizontal upper run on which the molds stand upright with their fill apertures at the top, and a horizontal lower run on which the molds are upside down. The conveyor supports transverse mold bottoms (17) to which rows of molds are fixedly attached. Mold lids (20) which are open when the molds are on the upper run are automatically closed when the molds are moved down to the lower run, are maintained closed along most of the lower run, are opened for emptying the finished cheeses into a water basin (4), and are opened when the molds are moved back up onto the upper run. The arrangement makes possible the automatic filling of the molds by a filling device (3) located above the conveyor, and forced pressing of the curd by a pressing device (5) above the conveyor and downstream the filling device.

10 Claims, 1 Drawing Sheet

U.S. Patent     Jun. 14, 1988     4,750,415
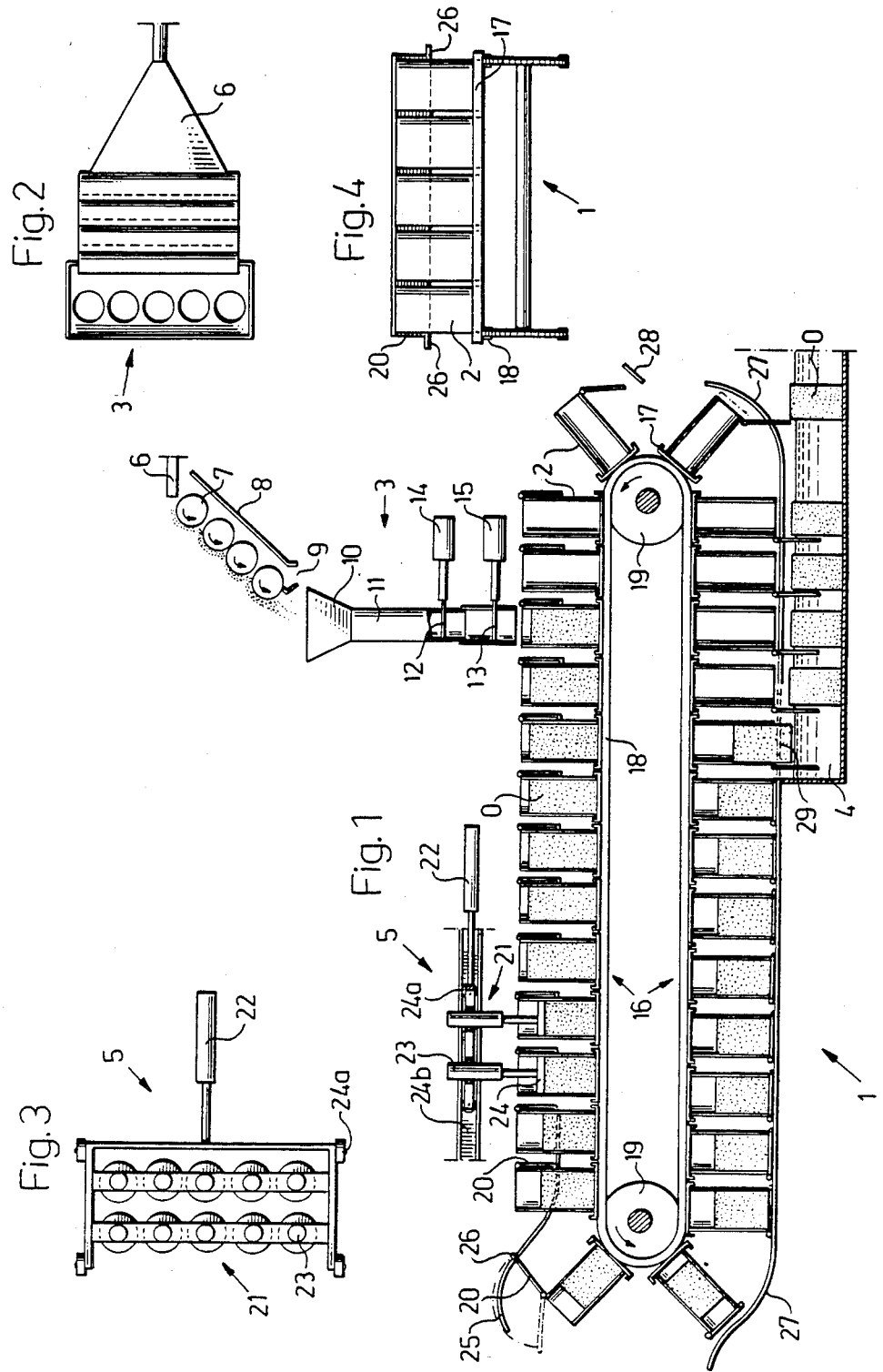

DEVICE FOR PRESSING AND MOLDING CURD

BACKGROUND OF THE INVENTION

In pressing curd to mold cheeses the curd and whey conventionally are poured into molds having perforated walls and loosely placed on perforated plates whereupon the curd for a period of time is allowed to shrink under its own weight. During such period of time the molds are reversed a number of times in order for the resulting cheese to become as homogeneous as possible. Sometimes this self-pressing is carried out in combination with forced pressing by means of piston-like devices. The forced pressing will shorten the pressing time. The molds and the bottoms thereof, and the plate on which they are placed, are perforated to allow the whey to escape.

This prior art has several disadvantages. Even when the reversal of the molds is carried out by mechanical means this operation is time-consuming and costly. At least in the case of certain types of cheese the molds must be emptied by force. It is especially difficult to make tall cheeses in this matter.

SUMMARY OF THE INVENTION

The invention therefor has for its purpose the provision of a cheese press which eliminates the above disadvantages of the prior art. Especially, the cheese press of the invention is to allow also tall cheeses to be manufactured without special difficulty, and it is to permit pressing the cheeses as desired without the cheeses sticking. These purposes are obtained by the device of the claims.

BRIEF DESCRIPTION OF THE DRAWINGS

FIG. 1 is a side elevational view of the complete device,

FIG. 2 a top planar view of the filling device,

FIG. 3 a top planar view of the pressing device, and

FIG. 4 a partial end elevational view of the mold reverser.

DETAILED DESCRIPTION OF THE PREFERRED EMBODIMENT

The main portion of the preferred embodiment of the invention is constituted by a mold reverser 1 supporting a number of cheese molds 2 and associated with a device 3 for filling molds 2 with curd 0 and whey, a water basin 4 into which for reasons known to the expert cheeses 0 are delivered upon the pressing having been completed, and preferably a device 5 for forced pressing of curd. The elevational sub-views of FIGS. 2, 3 and 4 show filling device 3 and pressing device 5 in top planar views, and a row of formers 2 standing on the mold reverser in a partial elevational view.

Curd and whey are pumped to filling device 3 from a supply tank, not shown, to a device 6 which acts to evenly distribute the curd and the whey over the lengths of a number of preferably perforated rollers 7. These are mutually parallel and horizontal and have a length corresponding to the length of the rows of cheese molds 2 to be placed on mold reverser 1 transversely to the longitudinal direction thereof. Furthermore, rollers 7 are positioned adjacent each other with small mutual separations and above each other in a staircase arrangement wherein they overlap mutually as seen both vertically from above and horizontally laterally from viewing directions normal to the longitudinal axes of the rollers. The material emanating from distribution device 6, of a funnel-like configuration in planar view, will fall on the top face of top roller 7. Rollers 7 are rotated by means of a drive, not shown, such that the top peripheral surfaces of rollers 7 move from distribution device 6 so that, as will be immediately understood, the curd and whey delivered from this device will be moved downwardly from roller to roller. As this takes place the main portion of the curd will be transported downwardly along the staircase of rollers 7 while the main portion of the whey will be drained through the perforations of the rollers and/or the interstices between the rollers wherefrom it will fall down onto an inclined plate 8 along which it will run downwardly to be captured by a forward bottom lip of the plate from where, via a conduit 9, it will be conveyed to a tank (not shown).

The curd and a certain quantity of remaining whey will fall down from lowermost roller 7 into a horizontally elongated funnel 10. The latter is common to a number of vertical tubes 11 corresponding in number and location to cheese molds 2 in each row thereof on cheese reverser 1. Tubes 11, at the bottom thereof, are provided with two stops, viz. an upper stop 12 and a lower stop 13. These stops 12, 13, preferably taking the form of plates blocking tubes 11 and each common to all the tubes, are connected to piston-cylinder assemblies 14 and 15, respectively, by means of which blocking plates 12 and 13 selectively may be moved into or out of the tubes by a horizontal movement in an insertion or extraction direction. When the curd at the commencement of a cheese pressing operation initially falls down into tubes 11 lower blocking plate 13 initially is inserted in the tubes while upper blocking plate 12 is extracted therefrom. Tubes 11 hence are filled with curd from above and down to lower blocking plate 13. Tubes 11 preferably are perforated to allow whey to escape from the curd when the latter is in tubes 11. When tubes 11 have been completely filled upper blocking plate 12 is pushed into the tubes and lower blocking plate 13 is extracted from tubes 11. A piece of curd of a length corresponding to the distance between blocking plates 12 and 13 now falls out of each tube. These are located such that they each open immediately above an open-topped cheese mold 2 in a row thereof on cheese reverser 1. Preferably, the distance between blocking plates 12 and 13 is variable to allow the quantity of curd delivered from tubes 11 to be determined and varied as desired.

Contrary to what is the case in hitherto known cheese presses, in the device of the present invention cheese molds 2 are not loosely placed on a base plate on which they are handled in a single plane. Rather, according to the invention, cheese molds 2, preferably consisting essentially of for instance circular tubes having perforated walls and of course dimensioned according to the dimensions desired for the finished cheese, are fixedly attached to a conveyor track 16 consisting of a number of elongated perforated cheese mold bottom plates 17 each preferably common to the cheese molds of each row thereof on conveyor track 16. Preferably, cheese molds 2 are attached to mold bottom plates 17 by being welded thereto. Mold bottom plates 17, resting upon and sliding along longitudinal rails, not shown, at their outer edges are provided with a pair of endless chains 18 laid about two pairs of vertical sprockets 19 which in each pair are joined by a horizontal shaft. The distance between the pairs of sprockets and the length of the chains of course are selected with regard to the number of mutually adjacent rows of cheese molds 2 that conveyor track 16, or mold reverser 1, is desired to accomodate. Preferably, in the manner shown by the drawing, the upper and lower runs or parts of conveyor track 16 are filled with rows or cheese molds.

On the upper part of conveyor 16 cheese molds 2 in their rows are placed with lids 20, provided for the top ends thereof and pivoted at one top edge thereof, opened and hanging vertically downwardly between them.

Filling device 3 is located such above mold reverser 1 so as to not interfere with device 5 for forced pressing curd 0 in molds 2, sprockets 19, of course, being arranged to drive chains 18 in a direction causing transport of cheese molds 2 on the top part of conveyor track 16 to take place from filling device 3 to pressing device 5.

Like filling device 3 press 5 is located immediately above cheese molds 2 on conveyor track 16. It consists of a press carriage 21 reciprocally movable horizontally, preferably by means of a piston-cylinder assembly 22 and carrying at least one row of piston-cylinder assemblies 23 of a number and location, transversely to conveyor track 16, corresponding to the number and location of molds 2 in the rows of molds on conveyor track 16. The pistons of assembly 23 are vertically reciprocatable and carry horizontal press plates 24 moved upwardly and downwardly in molds 2 by assemblies 23 to press the curd therein. Press carriage 21, which is movable on wheels 24a running in rails 24b, follows molds 2 in their movement in the direction of transport of conveyor track 16, before returning to a point of origin, for a distance of sufficient length to allow press plates 24 inserted into molds 2 to exert a pressure on the curd for a suitable period of time (about one minute), with regard to the velocity of conveyor track 16 which, in the embodiment shown, is such that chains 18 will complete a revolution in about 20 minutes.

Upon mold rows arriving at the pair of sprockets 19 located downstream of press 5 in the direction of motion of the upper part of the conveyor track 16 molds 2 are moved about the track end formed by the sprockets and are reversed into an upside down attitude in the manner shown by the drawing. At the end of conveyor track 16 in question and at the outer sides thereof there are located a pair of upper guide rails 25 arranged to affect guide pins or, preferably, guide trundles 26 provided at the outer corners of lid 20 in such a manner that, at the moment molds 2 commence arriving at the curved end portion of conveyor track 16 sufficiently for the molds to have begun to assume a position wherein they are inclined sufficiently to the vertical for a widened clearance to have been created between inclined molds 2 and the adjacent row of still vertical molds 2, lids 20 are lifted and thereupon swung 270° while molds 2 are being moved towards a more and more upside down attitude so that lids 20 will close the hitherto open top ends of molds 2. In order for lids 20, preferably perforated, to remain in closing position also after molds 2 have moved to be on the lower part of conveyor track 16 and have been completely turned upside down a pair of lower guide rails 27 are also provided below conveyor track 16, guide rails 27 being located and shaped to catch, in the closing position of lids 20, the guide pins or trundles 26 and to continue to exert such load thereupon that lids 20 will remain in closing position. Lids 20 now serve as mold bottoms for as long as molds 2 remain on the lower part of conveyor track 16.

Lower guide rails 27 normally extend along the entire lower part of conveyor track 16 and are terminated by an upwardly curved portion at the upstream end of the conveyor track with respect to its upper part so that lids 20 normally, i.e. during as many revolutions, usually 4, as are required for the desired pressing of the curd, are kept closed while molds 2 are on the lower part of conveyor track 16. Each time molds 2 pass the upstream end of conveyor track 16 with respect to the direction of transport of the upper part thereof lids 20 are again opened by a pair of short guide rails 28 provided at said end. When the pressing has been completed a portion, shown in broken lines at 29, of guide rails 27 is moved out of the way, viz. at the beginning of water basin 4 located below conveyor track 16. Lids 20 will now fall down and will remain hanging while molds 2 are being moved for a distance along the lower part of conveyor track 16 to allow curd 0 in the molds to fall out thereof and down into water basin 4. The molds need not be emptied by force. The empty molds 2 thereupon continue their motion along conveyor track 16 to be filled again with curd 0 by means of filling device 3.

Evidently, the device of the invention permits curd 0, conveniently, in a continuous operation and without the molds having to be handled one at a time manually or by means of special auxiliary devices, to be reversed and processed by pressing on account of its own weight and by forced pressing, and, without anyone having to intervene manually, to be transferred to a water bath in water basin 4 wherein preferably the water is kept flowing in the same direction as the molds are transported on the lower part of conveyor track 16. Those cheeses 0 being in the water bath are moved therein by means of lids 20 of molds 2 hence acting in the water bath as pushers for the cheeses. The fact that the water is maintained flowing in the direction of transport reduces the need of a pushing load so that hanging lids 20 will efficiently act as pushers.

The whole apparatus without difficulty may be provided in a closed chamber wherein the temperature and humidity of the air is controlled easily.

What is claimed is:

1. A device for molding and pressing curd (0) provided with molds (2) constituted by perforated tubes of selected cross sectional shape and dimension, the curd to be molded and pressed into cheeses, characterized in that a plurality of molds (2) are fixedly attached to a plurality of horizontal, perforated, elongated mold bottom plates (17) each having a row of a selected number of molds, the mold bottom plates being mutually pivotably interconnected to form an endless conveyor track (16) at right angles thereto and continuously movable and revolving in vertical planes and defining a horizontal upper run wherein the rows of molds are closely adjacent each other and are standing upright with free ends thereof defining upwardly open apertures, and a horizontal lower run wherein the rows of molds are closely adjacent each other and hang with their apertures open downwardly, the molds being provided with perforated lids (20) adapted, when the molds are in the upper run of the track, to be in positions whereat the apertures of the molds are exposed, and, when the molds are in at least an upstream portion of the lower run of the track, to be in positions whereat the apertures of the molds are closed, the lids being openable in at least a downstream portion of the lower run of the track, so that the molds may be caused, by the track, to selectively carry out revolutions of a selected duration of time and to be reversed, when being transferred from one run to another run, at selected time intervals and in so doing and when they are in the upper run to expose interiors thereof to a device (3) for filling the molds with curd (0) and whey located at an upstream end of the upper run and above the upper run, and to a press (5) for forced pressing of the curd in addition to self-pressing thereof located downstream of the filling device and above the upper run, and, when the molds are in the lower run, to allow the curd to fall down into a water basin (4) provided below the lower run and along a downstream portion thereof.

2. The device of claim 1, wherein two short end edges of the mold bottom plates (17) are interconnected by substantially horizontal, flexible, elongated, endless driver members (18) such as chains, extending at right angles to the mold bottom plates and laid about two pairs of elements (19) such as sprockets, driving the driver members and provided at the same level and folding the driver members in respective vertical planes, said pairs of folding and driving elements being located at a mutual distance to allow a desired number of rows of molds to be accommodated to the conveyor track (16) formed by the mold bottom plates and the driver elements and transporting the molds.

3. The device of claims 1 or 2, wherein the lids (20) are common to all the molds (2) in each row and are pivotable from an open position wherein they hang down along one vertical side of the molds to a position closing the apertures of the molds, and a guide rail (25) is provided at the downstream end of the upper run at both sides thereof, guide pins (26) at outer corners of the lid being adapted to engage each guide rail, the guide rails being shaped and located to lift the lids hanging down between the rows of the molds being transported on the upper run at a position where the upper run of the conveyor track (16) begins to be transformed into the lower run via the guide pins so that while the rows of molds are being moved from the upper run to the lower run and the molds are being reversed from a position with their apertures at the top to a position with their apertures at the bottom, the lids swing to a position whereat they close the molds with their guide pins captured by a lower guide rail (27) provided at each side of the lower run and extending from the upstream end to the downstream end thereof, each lower guide rail being adapted to normally maintain the lids of the reversed molds in a closing position until the molds reach a position where the lower run of the conveyor track begins to be transformed into the upper run at which position there is provided at least one further guide rail (28) for opening the lids in cooperation with the guide pins.

4. The device of claim 3, wherein a portion of the lower guide rail (27) is adapted to be moved out of the way at an upstream end of the water basin (4) to allow the lids (20) to selectively drop to open positions to permit finished cheeses to fall out of the molds (2) and down into the water basin, a bottom of which is at a level with respect to the lower run of the conveyor track to allow the hanging lids to transport the cheeses along the water basin.

5. The device of claim 1, wherein the device (3) for filling the molds (2) with curd (0) and whey comprises a transverse row of vertical, perforated tubes (11) having at tops thereof introduction apertures and at bottoms thereof and immediately above the molds, discharge apertures.

6. The device of claim 5, wherein adjacent the discharge apertures of the tubes (11) there is provided an upper obstruction plate (12) horizontally introducible into or extractable out of the tubes by first piston-cylinder means, and a lower obstruction plate (13) horizontally introducible into or extractable out of the tubes by second piston-cylinder means, a predetermined portion of the curd poured into the tubes being severable therefrom by the obstruction plates to be allowed to fall down into the molds.

7. The device of claim 6, wherein the vertical distance between the plates (12, 13) is variable.

8. The device of claims 5, 6 or 7, wherein the tubes (11) at their introduction apertures have a funnel (10) supplied with curd and whey by a roller conveyor having horizontal, elongated, perforated and mutually spaced rollers (7) arranged to form a staircase, a bottom roller being adjacent the funnel and a top roller being adapted to receive curd and whey from a horizontal, substantially planar feed funnel (6).

9. The device of claim 1, wherein the press (5) for forced pressing the curd comprises at least one transverse row of vertically directed compression pressure exerting means (23, 24) horizontally reciprocatable along the conveyor track (16) above the upper run for exerting compressing pressure on the curd in the molds (2) at selected intervals and for selected lengths of time.

10. The device of claim 9, wherein the means exerting compression pressure comprises horizontal press plates (24) driven vertically reciprocatably by a piston-cylinder assembly (23) and adapted to be moved down into and pulled out of the molds (2), and supported by a carriage (21) horizontally reciprocatable above the molds along the conveyor track (16) by a further piston-cylinder assembly, the carriage being movable on rollers (24a) supported by horizontal rails (24b).

* * * * *